United States Patent [19]

Brandstetter et al.

[11] 4,438,237

[45] Mar. 20, 1984

[54] THERMOPLASTIC MOLDING MASSES OF STYRENE-ACRYLONITRILE AND POLYAMIDE

[75] Inventors: Franz Brandstetter, Neustadt; Juergen Hambrecht, Heidelberg; Rudolf H. Jung, Worms; Gerhard Lindenschmidt, Leimen, all of Fed. Rep. of Germany

[73] Assignee: BASF Aktiengesellschaft, Ludwigshafen, Fed. Rep. of Germany

[21] Appl. No.: 347,648

[22] Filed: Feb. 10, 1982

[30] Foreign Application Priority Data

Feb. 17, 1981 [DE] Fed. Rep. of Germany ....... 3105653

[51] Int. Cl.$^3$ .............................................. C08L 77/00
[52] U.S. Cl. ..................................... 525/183; 525/184
[58] Field of Search ................................ 525/183, 184

[56] References Cited

U.S. PATENT DOCUMENTS

| | | | |
|---|---|---|---|
| 2,573,273 | 10/1951 | Porth | 525/184 |
| 3,033,813 | 5/1962 | Werner | 525/183 |
| 3,218,371 | 11/1965 | Grabowski | 525/183 |
| 3,243,478 | 3/1966 | Seelig | 525/183 |
| 3,243,479 | 3/1966 | Seelig | 525/183 |
| 3,597,498 | 8/1971 | Christensen | 525/183 |
| 4,307,207 | 12/1981 | Wiggins | 525/184 |

FOREIGN PATENT DOCUMENTS 45-29675  9/1970  Japan .................................. 525/184

*Primary Examiner*—Paul Lieberman
*Attorney, Agent, or Firm*—Norbert M. Lisicki

[57] ABSTRACT

Thermoplastic molding masses comprise a styrene and/or α-methylstyrene-acrylonitrile copolymer and a polyamide based on piperazine.

6 Claims, No Drawings

THERMOPLASTIC MOLDING MASSES OF STYRENE-ACRYLONITRILE AND POLYAMIDE

BACKGROUND OF THE INVENTION

1. Field of the Invention

The invention relates to thermoplastic molding masses based on styrene-acrylonitrile copolymers and a polyamide based on piperazine.

2. Description of the Prior Art

Lubricants such as butyl stearate, paraffin oil, zinc stearate or polyethylene wax are added to styrene polymers in order to improve the processing properties. German Published Application 29 16 668 relates to thermoplastic molding masses of styrene-acrylonitrile copolymers having, as antistatic agents and processing auxiliaries, oxyethylene oxypropylene block copolymers. As other antistatic agents for acrylonitrile-butadiene-styrene (ABS), molding masses, alkanolamines are suggested in U.S. Pat. No. 3,625,915 and alkali carboxylates in combination with alkyl oxide polymers are suggested in British Pat. No. 1,335,685.

The use of the above additives in styrene-acrylonitrile copolymers results in molding means of certain properties. A significantly improved flowability of the styrene-acrylonitrile copolymers is desired. The transparency should be maintained and no other detrimental effects should be incurred such as efflorescence of the additives, discolorations and reduced viscosity.

A purpose of this invention, therefore, was the production of thermoplastic molding masses of styrene-acrylonitrile polymers with high flowability, transparency and coating-free surface wherein the molding masses do not discolor and do not have any reduced mechanical properties.

SUMMARY OF THE INVENTION

This requirement is met by the molding masses of this invention which contain a polyamide as lubricant which is miscible with the styrene-acrylonitrile copolymer.

This invention relates to thermoplastic molding masses consisting primarily of (a) 80 to 99.5, preferably 95 to 99, parts by weight of copolymers of styrene and/or α-methylstyrene and acrylonitrile wherein the copolymers contain 25 to 35 percent by weight of acrylonitrile in polymerized form, (b) 0.5 to 20, preferably 1 to 5, parts by weight of a polyamide, which is produced from
  (1) 0 to 18, preferably 8 to 13, percent by weight of adipic acid/hexamethylenediamine salt, and
  (2) 100 to 82, preferably 92 to 87, percent by weight of a salt of piperazine and a mixture of decanedicarboxylic acid and azelaic acid in a mole ratio of 70:30 to 95:5, preferably 80:20 to 92:8 and optionally
  (3) other polyamide forming raw materials as well as (c) optional commonly used additives and/or auxiliaries in effective quantities whereby the total of the parts by weight (a) and (b) is equal to 100.

DESCRIPTION OF THE PREFERRED EMBODIMENTS

Component (a) contained in the molding masses of this invention is one or more rubber-free copolymers of styrene and acrylonitrile. Also useful as the styrene is α-methylstyrene or mixtures of styrene and α-methylstyrene. The acrylonitrile content in these copolymers is between 25 to 35 percent by weight relative to the respective copolymer.

Component (a) can be produced in accordance with traditional methods, for instance, according to the procedure in German Application 10 01 001 or German Patent 10 03 436. Thus, the copolymerization of the styrene and/or α-methylstyrene with the acrylonitrile may be carried out in bulk, in solution, suspension or aqueous emulsion. Component (a) preferably has a viscosity number of 40 ml/gram to 100 ml/gram, particularly of 50 ml/gram to 85 ml/gram. The viscosity number is determined in accordance with DIN 53 726. For this determination, 0.5 gram of material is dissolved in 100 ml of dimethylformamide.

Component (b) of the molding masses of this invention is a copolyamide based on piperazine. It is produced according to known methods by melting polycondensation of the components at 180° C. to 300° C., preferably 200° C. to 280° C., optionally in the presence of traces of a monofunctional carboxylic acid such as stearic acid or propionic acid as a molecular weight regulator discharging the reaction water.

Examples of component (b)(1) are adipic acid/hexamethylenediamine salt and component (b)(3) are other polyamide forming starting materials such as dicarboxylic acids, ω-aminocarboxylic acids and lactams. Preferred as component (b) is a copolyamide of 8 percent by weight of adipic acid/hexamethylenediamine salt and 92 percent by weight of a salt of piperazine and a mixture of decanedicarboxylic acid and azelaic acid in a mole ratio of 80:20.

The K-value of the copolyamides, measured according to H. Fikentscher, Cellulosechemie 13 (Cellulose Chemistry)(1932), pages 58 through 64 and 71 through 74, at 20° C. in a 1 percent solution in 96 percent sulfuric acid is generally located in the range of 35 to 70, preferably 40 to 65. Such copolyamides are described, for instance, in German Patent 26 30 114.

Component (b) is worked into the copolymer (a) in a basically familiar fashion.

The mixtures of components (a) and (b) of this invention may contain as an additional component (c) all additives and/or auxiliaries which are commonly used for SAN, styrene-acrylonitrile, polymers. Examples for such additives and/or auxiliaries include: fillers, other compatible plastics, dyes or pigments, antistatic agents, antioxidants, flame retardants, and additional lubricants. The additives and auxiliaries are used in commonly applied and effective quantities, preferably in quantities of 0.1 up to a total of approximately 30 percent by weight relative to the mixture (a+b).

The additives are incorporated into component (a), for instance, together with component (b).

Surprisingly, it was found that the molding masses of this invention have a high viscosity and good flowability and result in finished parts with a surface which does not show any coating.

The invention is explained by way of the following examples.

All parts and percentages referred to in the examples refer to weight unless otherwise noted.

EXAMPLES AND COMPARISON TESTS

The following styrene-acrylonitrile copolymers are used for the following Examples 1–6 and Comparison Tests A–G:

| Type | Styrene-Acrylonitrile Copolymers Contents of | | | |
|---|---|---|---|---|
| | Styrene (% by wt.) | α-methylstyrene (% by wt.) | Acrylonitrile (% by wt.) | Viscosity No. (ml/grams) |
| I | 75 | — | 25 | 100 |
| II | 65 | — | 35 | 80 |
| III | — | 70 | 30 | 58 |
| IV | 80 | — | 20 | 100 |

Used as the polyamide component (b) was a copolyamide consisting of 8 percent by weight of adipic acid/hexamethylenediamine salt and 92 percent by weight of salt of piperazine and a mixture of decandicarboxylic acid and azelaic acid in a ratio of 80:20 and having a K-value of 50.

In a mixing extruder, the parts by weight of component (a) and polyamide (b) listed in the table and in the case of the comparison rates of an additional component were melted, mixed, homogenized and granulated at 250° C.

The impact resistance was determined at 20° C. in accordance with DIN 53 453 using standard, small rods sprayed (extruded) at 250° C. and the melting index, an indication of the flowability, was determined according to DIN 53 735.

In order to examine the formation of a surface coating by lubricant which has defused to the surface, pressed panels having dimensions of 50×80×2 mm were produced at 200° C. The pressed panels were stored in a chamber resembling a tropic environment at 40° C. After certain intervals, the panels were checked visually for the formation of a surface coating.

In order to evaluate the transparency, round disks having dimensions of 60×2 mm were sprayed with a mass temperature of 250° C. and a mold temperature of 30° C. Using these molded parts, the transparency was examined visually (grade 1 glass clear transparency; grade 6 no transparency).

1. A thermoplastic molding mass comprising, based on a 100 parts of (a)+(b):
  (a) 95 parts by weight to 99 parts by weight of a copolymer of styrene and/or α-methylstyrene with acrylonitrile wherein the copolymers contain 25 percent by weight to 35 percent by weight of acrylonitrile in polymerized form,
  (b) 1 part by weight to 5 parts by weight of a polyamide made from
    (1) 8 percent by weight to 13 percent by weight of adipic acid/hexamethylene diamine salts and
    (2) 92 percent by weight to 87 percent by weight of a salt of piperazine and a mixture of decane dicarboxylic acids and azelaic acids in a mole ratio of 80:20 to 92:8.
2. The thermoplastic molding mass of claim 1 wherein the component (a) is a copolymer of styrene with acrylonitrile wherein the copolymer contains 35 percent by weight of acrylonitrile in polymerized form, said component (a) having a viscosity number of 50 to 85 ml/grams.
3. The thermoplastic molding mass of claim 2 wherein the component (b) is a polyamide made from
  (1) about 8 percent by weight of adipic acid/hexamethylene diamine salts and
  (2) about 92 percent by weight of a salt of piperazine and a mixture of decanedicarboxylic acids and azelaic acid in a mole ratio of about 80:20, said component (b) having a K-value of 40 to 65.
4. The thermoplastic molding mass of claim 2 wherein said component (a) has a viscosity number of about 80.
5. The thermoplastic molding mass of claim 3 wherein said component (b) has a K-value of about 50.
6. A thermoplastic molding mass comprising, based on a 100 parts of (a)+(b),
  (a) 95 parts by weight to 99.5 parts by weight of copolymers of styrene and/or α-methylstyrene with acrylonitrile wherein the copolymers contain 25 percent by weight to 35 percent by weight of acrylonitrile in polymerized form,

TABLE

| Examples (in accordance with the invention) | Component (a) Styrene-Acrylonitrile Copolymer (pbw) | Type | Component (b) Polyamide (pbw) | | Melting Index at 21.5 kp 200° C. (g/10 min.) | Impact Resistance (kJ/m²) | Transparency | Surface Coating | Comments |
|---|---|---|---|---|---|---|---|---|---|
| 1 | 99 | I | 1 | | 19 | 15.6 | 1 | no | |
| 2 | 95 | I | 5 | | 21 | 22.2 | 1 | no | |
| 3 | 99 | II | 1 | | 30.3 | 15.2 | 1 | no | |
| 4 | 95 | II | 5 | | 36.6 | 14.9 | 1 | no | |
| 5 | 99 | III | 1 | | 11 | 14.4 | 1 | no | |
| 6 | 95 | III | 5 | | 14 | 14.8 | 1 | no | |
| Comparison Tests (not according to the invention) | | | | | | | | | |
| A | 99 | IV | 1 | | 20 | 13.7 | 3 | no | |
| B | 95 | IV | 5 | | 20 | 13.9 | 5 | no | |
| | | | Lubricant | | | | | | |
| | | | Type | (% by wt.) | | | | | |
| C | 99 | I | (a) | 1 | 23 | 15.2 | 1 | no | |
| D | 99 | II | (b) | 1 | 12 | 14.8 | 1 | no | pronounced yellow coloration |
| E | 100 | I | — | — | 10 | 15.2 | 1 | no | |
| F | 100 | II | — | — | 24 | 15.0 | 1 | no | |
| G | 100 | III | — | — | 4 | 14.9 | 1 | no | |

(a) Ethylene oxide, propylene oxide, three block copolymer (compare Example 5 German Published Application 29 16 668)
(b) Bistearylamide of ethylene diamine.

The embodiments of the invention in which an exclusive privilege or property is claimed are defined as follows:

25 percent by weight to 35 percent by weight of acrylonitrile in polymerized form, (b) 1 part by weight to 5 parts by weight of a polyamide made from
  (1) 0 percent by weight to 18 percent by weight of adipic acid/hexamethylene diamine salts and
  (2) 100 percent by weight to 82 percent by weight of a salt of piperazine and a mixture of decane dicarboxylic acids and azelaic acids in a mole ratio of 70:30 to 95:5.

* * * * *